United States Patent [19]

Warren et al.

[11] Patent Number: 4,801,423
[45] Date of Patent: Jan. 31, 1989

[54] RADIATION SHIELDING DOOR ASSEMBLY

[75] Inventors: Douglas H. Warren, West Springfield, Mass.; John C. Matthews, Windsor, Conn.; Jay M. Baldwin, East Granby, Conn.; Charles M. Ashman, Weatogue, Conn.; James W. Finlayson, Suffield, Conn.

[73] Assignee: Combustion Engineering, Inc., Windsor, Conn.

[21] Appl. No.: 124,333

[22] Filed: Nov. 20, 1987

Related U.S. Application Data

[63] Continuation of Ser. No. 851,780, Apr. 14, 1986.

[51] Int. Cl.⁴ .............................................. G21C 11/02
[52] U.S. Cl. ................................. 376/287; 250/515.1
[58] Field of Search .............................. 165/11.2, 72; 250/515.1; 376/287

[56] References Cited

U.S. PATENT DOCUMENTS

| 3,785,925 | 1/1974 | Jones | 376/287 |
| 4,071,404 | 1/1978 | Aoki | 376/287 |
| 4,638,166 | 1/1987 | Baudro | 250/515.1 |

FOREIGN PATENT DOCUMENTS

| 0131168 | 1/1985 | European Pat. Off. | 376/287 |
| 1146208 | 3/1963 | Fed. Rep. of Germany | 250/515.1 |
| 1171545 | 6/1964 | Fed. Rep. of Germany | 250/515.1 |
| 2534730 | 4/1984 | France | 250/515.1 |
| 0213890 | 10/1985 | Japan | 250/515.1 |

Primary Examiner—Charles T. Jordan
Assistant Examiner—Richard W. Wendtland
Attorney, Agent, or Firm—Chilton, Alix & Van Kirk

[57] ABSTRACT

A radiation-reducing door assembly which may be configured as either an entry port or a ventilation port. The door assembly includes a split ring flange-type mounting bracket which can be quickly and easily installed on a manway flange regardless of the state of the manway cover mounting studs. A pair of radiation shielding doors or a ventilation port door may be quickly and easily coupled to the split ring mounting bracket.

27 Claims, 5 Drawing Sheets

RADIATION SHIELDING DOOR ASSEMBLY

This is a continuation of co-pending application Ser. No. 851,780 filed on 4/14/86.

BACKGROUND OF THE INVENTION
1. FIELD OF THE INVENTION

The present invention relates to facilitating the maintenance of nuclear power systems and particularly to minimizing the exposure to radioactivity of service personnel working in the vicinity of the steam generator of a nuclear power system during the performance of routine periodic maintenance thereon. More specifically, this invention is directed to radiation shielding "door" assemblies which may be rapidly and easily installed over access openings which may be rapidly and easily installed over access openings which are provided in steam generators after removal of the covers such access openings pursuant to a maintenance and/or inspection procedure. Accordingly, the general objects of the present invention are to provide novel and improved methods and apparatus of such character.

2. DESCRIPTION OF THE PRIOR ART

While not limited thereto in its utility, the present invention has been designed for use in, and has special utility for, the servicing of the steam generators of nuclear power systems, particularly such systems which employ pressurized water type reactors. Such steam generators comprise a pressure vessel having a lower plenum area which is divided into two halves. A coolant, which has been heated in the reactor, is delivered to one of the plenum halves and is then circulated, via a bundle of tubes, through the steam generator vessel. The coolant is subsequently discharged from the other plenum half and returned to the reactor. During passage through the steam generator tube bundle, heat from the reactor coolant is transferred to water under pressure which subsequently flashes to steam for driving a turbine. Nuclear Regulatory Commission rules require periodic inspection of the steam generators of nuclear power systems. To this end, the steam generator vessel is provided with access openings, known in the art as "manways", in the lower plenum area. During normal operation, these access openings are sealed by means of covers. In order to perform inspections, after the vessel has cooled and the "primary loop" has been drained of reactor coolant, the existing manway covers are removed.

Once access to the interior of the steam generator pressure vessel is possible, a number of different procedures may have to be performed within the vessel. However, since the interior of the steam generator vessel is classified as a highly radioactive environment, maintenance personnel may work in the lower plenum area for only short periods of time. Thus, maintenance personnel will enter the lower planum area primarily for the purpose of erecting remotely controllable equipment which has been designed for rapid installation. This equipment will thereafter be operated from the exterior of the steam generator with power and commands being delivered to the remotely controllable equipment via flexible cables and conduits. The types of procedures which may have to be performed from within the lower plenum area of a steam generator vessel include non-destructive testing, steam generator tube pulling, steam generator tube plugging, installation of sleeves in steam generator tubes and the installation of nozzle dams to prevent backflow of coolant from the reactor pressure vessel should it be necessary to flood the reactor in order to perform separate operations thereon. The non-destructive testing will typically comprise ultrasonic and/or eddy current examination of the interior of a preselected percentage of the steam generator tubes. For example, 3% of the tubes will be tested to determine if there is any reduction in effective wall thickness, i.e., cracks, pits, or corrosion, of greater than 20% or any growth in effective wall thickness, i.e., scaling or other deposits, of more than 20%. If a preselected number of the tested tubes are found to exceed the set limits for increased or reduced wall thickness, an additional percent of the tubes will be tested.

Radiation will "stream" outwardly from an opened manway. Accordingly, steps must be taken to minimize the exposure to the manway "shine" of service personnel who are working on the operating platform in the vicinity of the manway. In this regard, it is to be noted that the manway covers cannot simply be re-installed to afford such protection since it is necessary for the above-mentioned cables and conduits to pass from the exterior control and monitoring apparatus to the interior of the steam generator. Additionally, to prevent condensation from forming therein, it is mandatory that the interior of the steam generator be constantly ventilated during the time it is out-of-service. Prior attempts to provide the requisite radiation shielding in the vicinity of an open manway have largely been limited to establishing a restricted area on the work platform outside of the steam generator and hanging lead blankets over the open manway to reduce the "shine" and "streaming" when access to the manway was not necessary. This has not proven to be a satisfactory procedure since the blankets take a long time to install, and the installers are subjected to radiation during the installation, and because the work platform is not large enough to store the blankets along with inspection/maintenance equipment when the blankets are taken down to permit access to the steam generator.

A European nuclear power system operator has employed a pair of rectangularly shaped hinged radiation door sets which are attached to specially designed rectangular mounting brackets. These mounting brackets are designed for attachment to the flange which extends around the manway and defines the manway opening, a pair of oppositely disposed mounting studs being required for the installation of each mounting bracket. These mounting brackets could be installed in only one orientation. A significant problem with such prior art radiation door sets is precipitated by the fact that the studs by which the manway cover is affixed to the flange which extends about the manway opening are often corroded to the point that they either are stuck and cannot be removed or break during the cover removal operation. In either case, there is a high degree of probability that the mounting brackets for prior art radiation shielding doors could not be installed without performing work in the vicinity of the open manway in order to provide the two-pair of oppositely disposed studs which are required for installation of the mounting brackets. The performance of such work in the vicinity of an open manway, as in the case of installation of hanging lead blankets, would expose the service personnel to maximum allowable radiation exposure within a very short time.

SUMMARY OF THE INVENTION

The present invention overcomes the above-discussed and other deficiencies and disadvantages of the Prior Art and in so doing comprises a novel method and apparatus for providing selective access to a radioactive environment. Specifically, the present invention comprises a novel radiation-reducing door assembly which, through the use of interchangeable components, may be employed either to allow access by service personnel to the radioactive environment behind the door or to couple the radioactive environment to a source of ventilating gas. The present invention also comprises a novel technique for the installation of a radiation-reducing door about an opening through which access to a radioactive environment may be gained.

Apparatus in accordance with the present invention comprises a split ring flange-type mounting bracket which supports a hanging door arrangement. The hanging door arrangement may comprise a pair of partially-overlapping half-doors which, in the closed position, are spaced from the flange-type mounting bracket to permit ventilation of the radioactive environment and to permit the entry of cables/conduits into the radioactive environment while preventing radiation "streaming". Alternatively, the hanging door arrangement may comprise a ventilation door having a tubular projection to which a conduit leading to or from a source of ventilation gas may be attached. The ventilating door arrangement is provided with an internal baffle, spaced from the split ring flange-type mounting bracket, so that ventilating gas may flow through the door without there being any direct, i.e., line-of-sight, path between the radioactive environment and the ambient environment.

The split ring flange-type mounting bracket of the present invention is provided with holes on the stud circle diameter of the manway flange. The mounting bracket may thus be installed regardless of the state of the manway cover mounting studs.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENT

Figure 1:
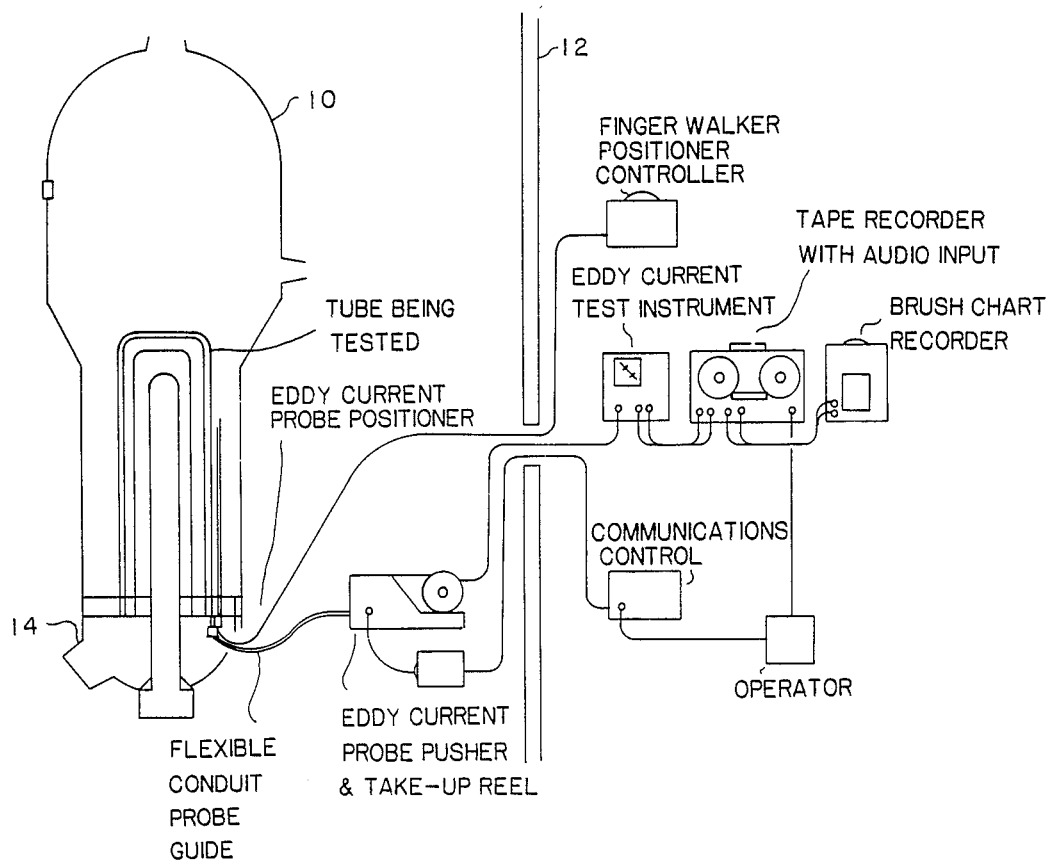
FIG. 1 is a side elevation view which schematically depicts the examination of a steam generator of a nuclear power system.

With reference to FIG. 1, a steam generator 10 is depicted as being located within a containment structure which has been represented by wall 12. The steam generator 10 includes a lower plenum area which forms part of the "primary" loop. The reactor coolant is delivered to the lower plenum area and is returned to the reactor via nozzles such as nozzle 14. The steam generator tubes, through which the coolant is circulated, begin and end in the lower plenum area, respectively at opposite sides of a divider plate. Manways are provided in the steam generator vessel to permit access to the lower plenum area. In FIG. 1 one of the manways is depicted in the open condition with flexible conduits and cables extending therethrough to remotely controlled test apparatus. In FIG. 1 the test apparatus is represented as an eddy current probe which will be passed through selected tubes. Some of the support equipment for the test apparatus which is erected within the steam generator will, as schematically shown in FIG. 1, be positioned within the containment structure on a work platform outside of the manway while other control, recording and analysis apparatus will be located to the exterior of the containment structure.

The manways will customarily be defined by annular flanges of equal size and shape which are welded to the steam generator pressure vessel. These manway defining flanges are provided with a plurality of threaded holes having their axes on a circle. These threaded holes receive threaded studs by which the manway cover is bolted to the flange to normally seal the manway.

Figure 2:
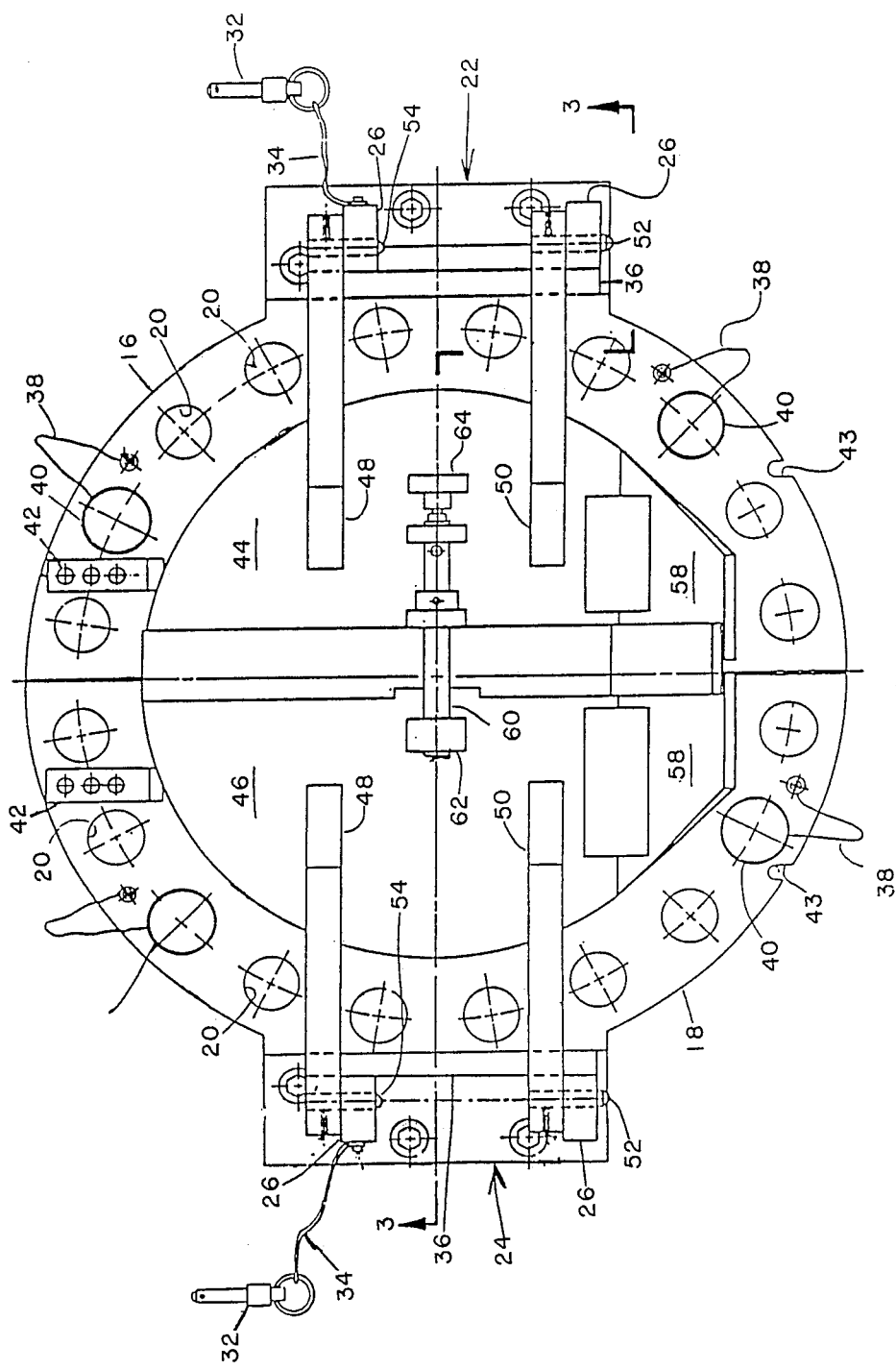
FIG. 2 is a front plan view of a radiation-reducing door assembly in accordance with the present invention.
Figure 3:
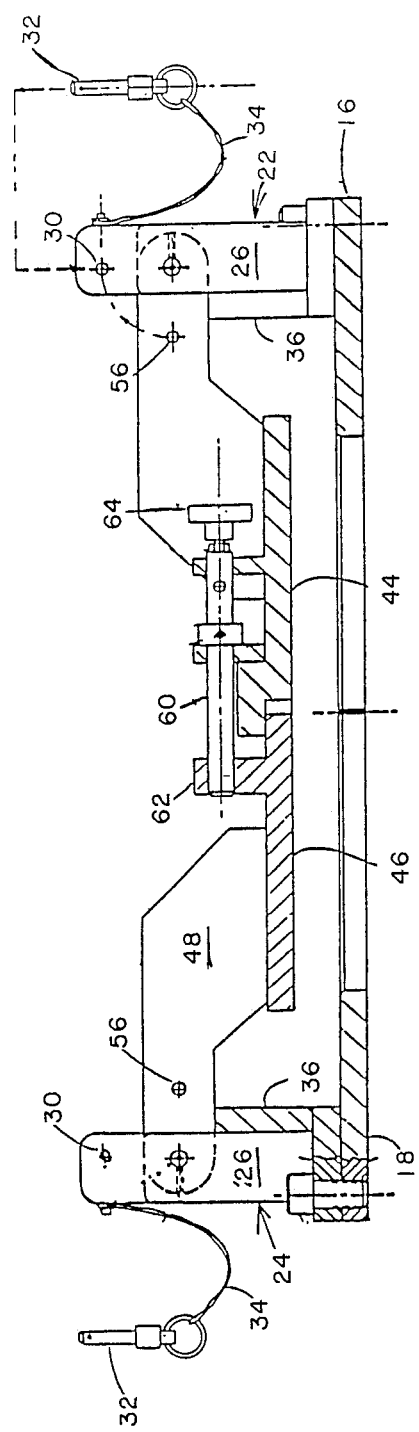
FIG. 3 is a cross-sectional view of the door assembly of FIG. 2 taken along the line 3—3 of FIG. 2.

Referring now to FIGS. 2 and 3, a radiation-reducing door assembly in accordance with the present invention comprises a split ring flange-type mounting bracket defined by two 1180° sections, i.e., a right ring section 16 and a left ring section 18. The split-ring is provided with holes 20 on the stud circle diameter of the manway flange and spaced apart by the same distance as the manway cover studs. Accordingly, the split ring assembly may be installed with or without all of the manway cover mounting studs in place. The employment of a split ring flange-type mounting bracket permits the radiation-reducing door of the present invention to be installed around any cables or conduits which may have previously been passed through the manway.

The ring sections 16 and 18 are respectively provided with hinge defining members which are indicated generally at 22 and 24. The hinge defining members are bolted to aligned, laterally extending projections of their associated ring sections and thus are located outwardly with respect to the stud circle to provide adequate stud clearance when entry port doors are coupled to the mounting bracket. As may best be seen from joint consideration of FIGS. 2 and 3, the hinge defining members each include a pair of arms 26 which extend outwardly in a direction which is generally transverse with respect to the plane defined by the split ring mounting bracket. The arms 26 of the hinge defining member on each ring section are provided with aligned hinge pin receiving apertures. At least the upper pair of arms 26 is also provided with a further aperture 30 which is designed to receive a locking pin 32. The locking pins are tethered to the arm 26 with which they cooperate by means of flexible retaining wires 34. The hinge defining members are further provided with stop plates 36 which, in the disclosed embodiment, extend from the lower arm 26 of each hinge defining member to a point above the upper arm.

Each of the ring sections 16 and 18 has, also secured thereto by means of a flexible retaining wire 38, a pair of mounting bolts 40. These mounting bolts are selected so that they will engage the threaded mounting stud receiving apertures in the manway flange. The retaining wires 38 are sufficiently long, and their anchoring points selected, such that the availability of any one of four manway flange apertures will permit installation of each of the mounting bolts 40. Alternatively, it is possible to employ the manway cover mounting studs and retention nuts in the case where it has been impossible to remove all four studs in any one four stud sector.

The ring segments are additionally each provided with a hanger 42, the hangers being mounted so as to be in horizontal alignment and adjacent the tops of the ring segments when they are installed as depicted in FIG. 2. The hangers 42 are generally J-shaped and extend forwardly, i.e., in the same direction as the arms 26 of the hinge defining members.

The ring segments 16 and 18 are further provided with notches 43 with adjoining axially aligned areas which are slightly undercut. These notches, the purpose of which will be described below, provide regions, in alignment with the manway flange, which may be engaged from the exterior of the mounting bracket.

As depicted in FIGS. 2 and 3, the radiation-reducing door assembly of the present invention is configured as an entry port door assembly. Thus, a pair of doors 44 and 46 are respectively supported from hinge defining members 22 and 24. The doors 44 and 46 are comprised of a lead sheet sandwiched between sheets of anodized aluminum for structural rigidity and radiation shielding. Each door is provided with an upper pivot arm 48 and a lower pivot arm 50, the pivot arms extending from the exterior of the door forwardly and radially outwardly and defining planes which are generally transverse to the plane of the split ring mounting bracket. The arms 48 and 50 are provided, adjacent the free ends thereof, with pivot pins. The pivot pin 52 which extends from the lower arm 50 is of greater length than the pivot pin 54 which extends from the upper arm 48 to reduce alignment and insertion problems during the mounting of the doors, i.e., once the lower pin is in engagement with the hinge pin receiving aperture 28 in the lower arm 26 of the hinge defining member, the upper pin may be easily brought into alignment with the hinge pin receiving aperture in the upper of the arms 26 of the same hinge defining member. The upper pivot arms 48 are also provided with holes 56 which align with the locking pin receiving apertures 30 in the arms 26. When the holes 30 and 56 are in alignment, the locking pins 32 may be inserted to retain the doors in an open position enabling personnel or equipment access.

As may best be seen from FIG. 3, the flat edge of door 44 is shaped so as to overlap a linear portion of door 46. Accordingly, with the doors in the closed position as shown, there is no gap therebetween through which radiation may "stream".

As may also be best seen from FIG. 3, the points of mounting of the doors 44 and 46 from their respective hinged defining member arms 26 is spaced sufficiently outwardly from the split ring mounting bracket to insure a space between the closed doors and the mounting bracket. Teh doors are additionally sized and shaped to occupy an area which is larger than the access opening defined by the ring sections 16 and 18. The size and shape of the doors, coupled with the manner in which they are supported, permits ventilation of a steam generator on which the radiation-reducing door assembly has been temporarily mounted with the doors in the closed condition while simultaneously insuring that radiation emanating within the steam generator will be absorbed by the door structure and thus personnel working in the vicinity of the closed doors, for example to remove manway studs for cleaning and inspection, will receive minimum exposure to radiation.

The doors 44 and 46 are additionally provided, in regions adjacent the lower edges thereof, with portions 58 which flare outwardly. The outwardly flared portions cooperate to define an opening at the bottom of the doors of sufficient size to permit cables, flexible conduits and the like to be easily fed over the "sill" defined by the manway flange and split ring mounting bracket and into the steam generator vessel.

The doors 44 and 46 are also provided with a locking mechanism which includes a slide bar 60. The slide bar 60, with the doors in the closed and locked position, engages a hole in a boss 62 provided on door 36. The slide bar is permanently mounted on door 44 in the manner which may best be seen from FIG. 3, the locking mechanism being manually operated by means of a handle 64. The locking mechanism is designed so that it may be secured in the locked condition by means of a padlock.

Once the manway cover has been removed, the above-described radiation-reducing door assembly can be installed in less than 3 minutes and the installation can be done by a person standing outside of the radiation shine from the manway. As noted above, the split ring flange-type mounting bracket can be installed over stuck or broken studs. Because all of the components needed for the installation are tethered to the ring segments 16 and 18, once the installation is started it will be completed. After the split ring mounting bracket has been installed, the doors are merely set on the hinge arms 26 and the hinge pins engaged in the cooperating apertures to complete the installation. Once the doors have been closed and locked, test apparatus which is to be erected within the lower plenum of the steam generator can be set up on the work platform. An entry door assembly in accordance with the present invention has the advantages of portability, ease of installation, reduction in man-rem exposure of field service personnel, reduction of maintenance time and reduction in manpower costs. Further, as will be explained below, the split ring mounting bracket of the present invention will accept either the above-described entry doors or a single-piece ventilation door.

Figure 4:
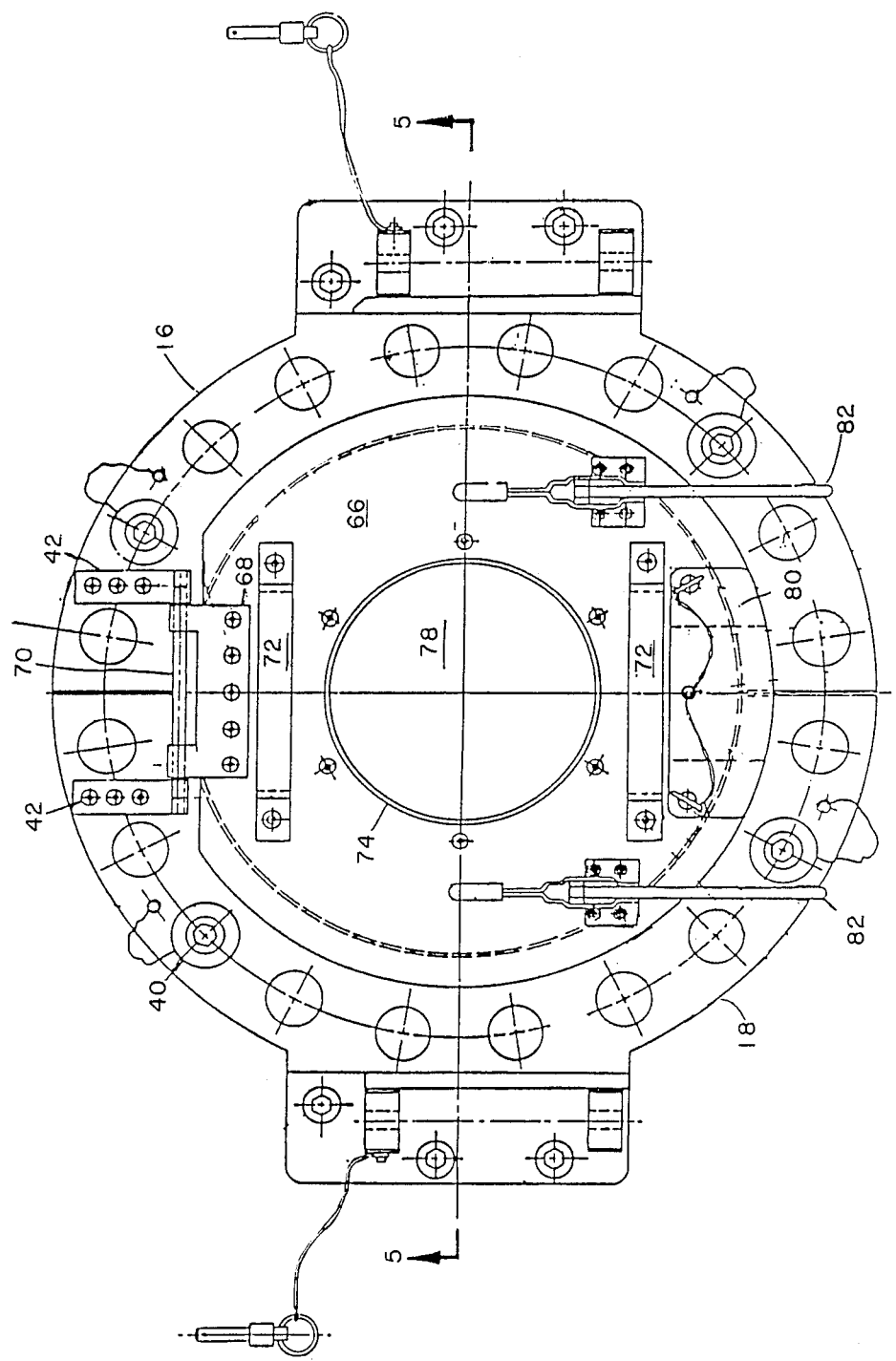
FIG. 4 is a front plan view of the door assembly of FIG. 2 configured as a ventilation door.
Figure 5:
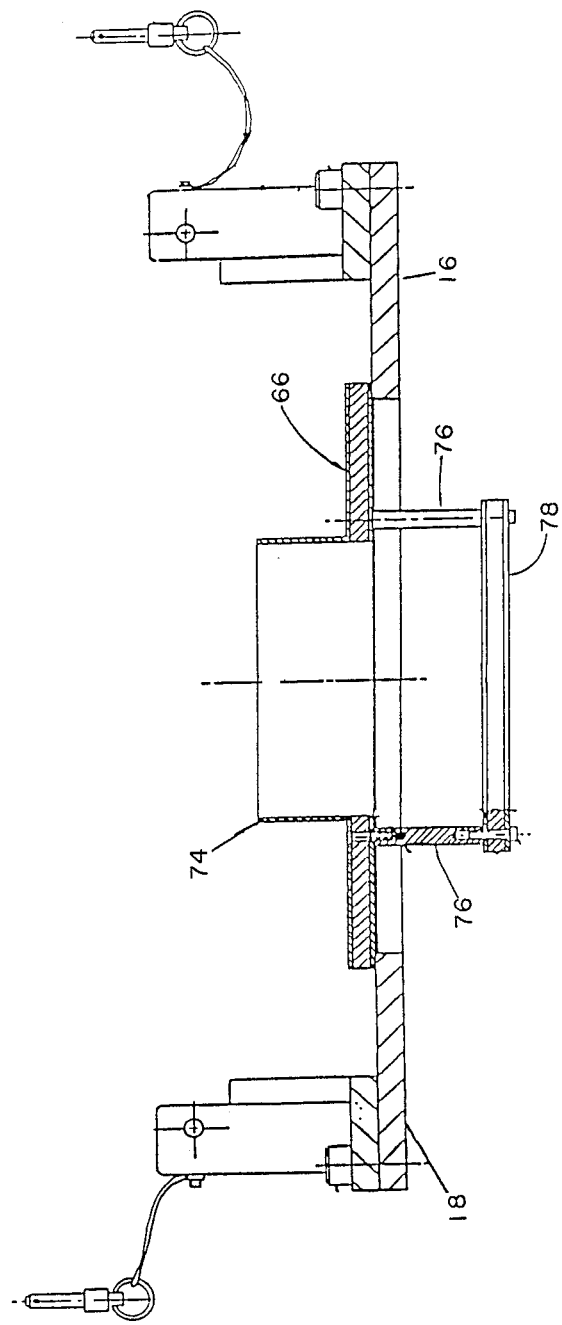
FIG. 5 is a cross-sectional view of the apparatus of FIG. 4 taken along the line 5—5 of FIG. 4.

Referring now to FIGS. 4 and 5, a ventilation port door in accordance with the present invention is essentially of one piece construction and is primarily comprised of an annular plate 66 which, like the above-discussed entry port doors 44 and 46, is comprised of a lead sheet sandwiched between two sheets of anodized aluminum. The plate 66 is provided, adjacent its upper edge, with a hinge plate 68 which extends outwardly beyond the top of plate 66. The hinge plate 68 receives a hinge pin 70 which may be engaged with the above-mentioned hangers 42. The ventilation port door may thus be installed on the split ring mounting bracket by simply lifting the plate 66, by means of handles 72, and engaging the pin 70 with the hangers 42.

A tubular extension 74 is welded to plate 66 about the aperture therein and thus defines a nozzle to which a variety of exhaust systems may be connected by means of flexible hosing and adapters. On the inside of plate 66, i.e., on the side opposite to nozzle 74, a plurality of spaced studs 76 are provided. As may be seen from Figure 5, a baffle 78 in the form of a lead plate is mounted on the studs 76 to provide a shield which prevents any radiation from streaming out of the exhaust nozzle while simultaneously permitting flow-through ventilation.

Returning again to consideration of FIG. 4, the plate 66 is provided, adjacent its lower edge, with a cut-out which is normally covered by a shielding cover 80. The cover 80 and the associated cut-out define a cable access port which enables wires and conduits to exit the steam generator while the lead shielding remains in place.

A pair of toggle levers 82 are mounted on the face of plate 66 and engage the above-mentioned notches 43 in the lower edges of the ring sections 16 and 18 to pull plate 66 tightly against the split ring flange-type mounting bracket.

To summarize, the ventilation port door of FIGS. 4 and 5 may be employed interchangeably with the entry port doors of FIGS. 2 and 3, i.e., either the entry port doors or the ventilation port door may be associated with the same split ring flange-type mounting bracket to define a novel radiation-reducing door assembly. The ventilation port door is characterized by one-piece construction, i.e., there is no center gap, in the interest of eliminating radiation streaming. The ventilation port door may be quickly installed simply by hanging the hinge pin 70 on the hangers 42 provided on the split ring mounting bracket and then securing the ventilation port door by means of the toggle lever clamps 82. The ventilation port door is of radiation absorbing construction and is provided, on its interior, with an inner shield 78 which overlaps the exhaust nozzle 74 to thereby eliminate streaming through the nozzle while permitting flow-through ventilation. The ventilation port door is also provided with a cable access port which may be opened by means of removal of the cover 80 thus enabling installation of the ventilation port door without disturbing wires and/or conduits which have previously been installed.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A readily mounted/demountable protective cover assembly for an opening, the opening having an axis and being defined by a flange having a plurality of spaced stud receiving apertures therein, said cover assembly comprising:
    a first mounting bracket, said first mounting bracket being sized and shaped to extend about approximately a first half of the periphery of the opening so as to at least partly overlie the opening defining flange, said first bracket being provided with a plurality of mounting holes arranged in a pattern which matches the pattern of stud receiving apertures in the flange;
    a second mounting bracket, said second mounting bracket being sized and shaped to extend about approximately the second half of the periphery of the opening so as to at least partly overlie the opening defining flange whereby the ends of said brackets may be placed in generally abutting relationship and said brackets will define an aperture which is in registration with the opening, said second bracket also being provided with a plurality of mounting holes arranged in a pattern which matches the pattern of the stud receiving apertures in the flange;
    hanger means affixed to said brackets for engaging and supporting an object, said hanger means defining a support axis which lies in a plane which is generally transverse to the axis of the opening;
    hinge means affixed to each of said brackets for pivotally supporting an object, said hinge means each having an outwardly extending portion, said outwardly extending portions being substantially parallel to one another and being provided with substantially parallel hinge pin receiving apertures; and
    cover means supportable from said brackets for preventing line-of-sight communication between the environments at the opposite sides of said cover means, said cover means permitting gas flow through the opening when supported from said brackets.

2. The apparatus of claim 1 wherein the cover means comprises:
    a pair of entry doors, said doors being constructed in-part of radiation absorbing material, one of said doors being supported on each of said hinge means outwardly extending portions, said doors being spaced from said brackets when in the closed condition to define a generally annular shaped gas flow port between said doors and said brackets.

3. The apparatus of claim 1 wherein the cover means comprises:
    means for defining a ventilation port, said port defining means being constructed in part of radiation absorbing material, said port defining means being supported from said hanger means so as to contact said brackets, said port defining means including a central opening, said port defining means further including a nozzle defining member extending from said port defining means on the side thereof disposed oppositely with respect to said brackets, said nozzle defining member being coaxial with said central opening, said port defining means also comprising a radiation shielding baffle affixed to and spaced from the side of said port defining means which contacts said brackets, said baffle having a larger area than said central opening and being in registration therewith.

4. The apparatus of claim 2 further comprising:
    means for locking said doors in the closed condition.

5. The apparatus of claim 2 wherein the abutting edges of said doors are linear and one of said doors includes a projection which overlies the gap between the doors when in the closed condition.

6. The apparatus of claim 5 further comprising:
    means for locking said doors in the closed condition.

7. The apparatus of claim 6 wherein said locking means is permanently affixed to one of said doors and engages a projection on the other of said doors.

8. The apparatus of claim 7 further comprising:
    means for retaining said doors in the open condition.

9. The apparatus of claim 8 wherein each of said doors comprises:
    a door member;
    at least a first mounting arm affixed to and extending from said door member; and
    a hinge pin permanently affixed to the end of said mounting arm which is disposed away from said door member, said hinge pin extending from said arm and engaging a hinge means hinge pin receiving aperture.

10. The apparatus of claim 9 wherein said doors each further comprise:
   a second mounting arm affixed to and extending from the door member; and
   a second hinge pin permanently affixed to the end of said second arm which is disposed away from said door member, said second hinge pin extending in the same direction as said first hinge pin, said hinge pins being as different length.

11. The apparatus of claim 3 wherein the ventilation port defining means comprises:
   a generally annular-shaped plate member;
   a hinge plate affixed to and extending outwardly from the outer edge of said annular plate member; and
   a hinge pin affixed to and extending outwardly from said hinge plate so as to be engagable with said hanger means.

12. The apparatus of claim 11 wherein said hanger means comprises:
   a generally J-shaped member affixed to each of said mounting brackets.

13. A readily mountable/demountable protective cover assembly for an opening, the opening having an axis and being defined by a flange having a plurality of spaced stud receiving apertures therein, said cover assembly comprising:
   a first mounting bracket, said first mounting bracket being sized and shaped to extend about a first peripheral portion of the opening so as to at least partly overlie the flange, said first bracket being provided with a plurality of mounting holes arranged in a pattern which matches the pattern of stud receiving apertures in the flange;
   a second mounting bracket, said second mounting bracket being sized and shaped to extend about a second peripheral portion of the opening so as to at least partly overlie the flange whereby the ends of said brackets may be placed in generally abutting relationship and said bracket will define an aperture which is in registration with the opening, said second bracket also being provided with a plurality of mounting holes arranged in a pattern which matches the pattern of the stud receiving apertures in the flange;
   hinge means affixed to at least one of said brackets for engaging and pivotally supporting an object, said hinge means having outwardly extending portions, said outwardly extending portions being substantially parallel to one another and being each provided with a hinge pin receiving channel; and
   movable cover means for engaging said hinge means pin receiving channels whereby said cover means is supportable from said hinge means so as to overlie the flange defined opening and be pivotable between open and closed positions, said cover means permitting gas flow through the opening between the environments at the opposite sides of said cover means when in the closed position, said cover means being at least in part constructed of radiation absorbing material.

14. The apparatus of claim 13 wherein the cover means comprises:
   a pair of said entry port doors, one of said doors being supported on each of said hinge means outwardly extending portions, said doors each being spaced from its supporting bracket when in the closed condition to define a generally angular shaped gas flow port between said doors and said brackets.

15. The apparatus of claim 14 further comprising:
   means for locking said door in the closed condition.

16. The apparatus of claim 14 wherein the abutting edges of said doors are linear and one of said doors includes a projection which overlies the gap between the doors when in the closed condition.

17. The apparatus of claim 16 further comprising:
   means for locking said doors in the closed condition.

18. The apparatus of claim 17 wherein said locking means is permanently affixed to one of said doors and engages a projection on the other of said doors.

19. The apparatus of claim 18 further comprising:
   means for retaining said doors in the open condition.

20. The apparatus of claim 14 wherein each of said doors comprises:
   a door member;
   at least a first mounting arm affixed to and extending from said door member; and
   a hinge pin permanently affixed to the end of said mounting arm which is disposed away from said door member, said hinge pin extending from said arm and engaging a hinge means hinge pin receiving channel.

21. The apparatus of claim 20 wherein said doors each further comprise:
   a second mounting arm affixed to and extending from the door member; and
   a second hinge pin permanently affixed to the end of said second arm which is disposed away from said door member, said second hinge pin extending in the same direction as said first hinge pin, said hinge pins being of different length.

22. The apparatus of claim 21 wherein the abutting edges of said doors are linear and one of said doors includes a projection which overlies the gap between the doors when in the closed condition.

23. The apparatus of claim 22 further comprising:
   means for locking said doors in the closed condition.

24. A readily mountable/demountable protective cover assembly for an opening, the opening having an axis and being defined by a flange having a plurality of spaced stud receiving apertures therein, said cover assembly comprising:
   a first mounting bracket, said first mounting bracket being sized and shaped to extend about approximately a first half of the periphery of the opening so as to at least partly overlie the opening defining flange, said first bracket being provided with a plurality of mounting holes arranged in a pattern which matches the pattern of stud receiving apertures in the flange;
   a second mounting bracket, said second mounting bracket being sized and shaped to extend about approximately the second half of the periphery of the opening so as to at least partly overlie the opening defining flange whereby the ends of said brackets may be placed in generally abutting relationship and said brackets will define an aperture which is in a registration with the opening, said second bracket also being provided with a plurality of mounting holes arranged in a pattern which matches the pattern of stud receiving apertures in the flange;
   hanger means affixed to said brackets for engaging and supporting an object, said hanger means defining a support axis which lies in a plane which is generally transverse to the axis of the opening; and
   cover means for at least in part covering the flange defined opening, said cover means being supportable from said brackets and including a central opening which defines a ventilation port whereby a ventilation gas flow through the opening between the environments at the opposite sides of said cover means may be established, said cover means being at least in part constructed of a radiation absorbing material, said cover means being supported from said hanger means so as to contact said brackets, said cover means further including a nozzle defining member extending outwardly from the side of said cover means which is disposed oppositely with respect to said brackets, said nozzle defining member being coaxial with said central opening, said cover means also comprising a radiation shielding baffle affixed to and spaced from the side of said cover means which contacts said brackets, said baffle having a larger area than said central opening and being partly in registration therewith.

25. The apparatus of claim 24 wherein said cover means comprises:
   a generally annular-shaped plate member;
   a hinge plate affixed to and extending outwardly from the outer edge of said annular plate member; and
   a hinge pin affixed to and extending outwardly from said hinge plate so as to be engageable with said hanger means.

26. The apparatus of claim 25 wherein said hanger means comprises:
   a generally J-shaped member affixed to each of said mounting brackets.

27. The apparatus of claim 13 wherein the said cover means comprises:
   at least a first entry port door, said door being at least in part comprised of a laminate which includes a layer of radiation absorbing material and a layer of material which imparts structural rigidity to the door.

* * * * *

UNITED STATES PATENT AND TRADEMARK OFFICE
CERTIFICATE OF CORRECTION

PATENT NO.  : 4,801,423

DATED       : Jan. 31, 1989

INVENTOR(S) : Douglas H. Warren et al

It is certified that error appears in the above-identified patent and that said Letters Patent is hereby corrected as shown below:

Claim 2, line 3, after "entry" insert --port--

Claim 10, line 9, change "as" to --of--

Claim 13, line 18, change "bracket" to --brackets--

Claim 14, line 1, change "13" to --27--

Claim 15, line 1, change "14" to --27--

Signed and Sealed this

Twenty-first Day of November, 1989

Attest:

JEFFREY M. SAMUELS

Attesting Officer        Acting Commissioner of Patents and Trademarks